E. & G. N. WATERBURY,

Assignors, by mesne assignments, to AMERICAN SHIP WINDLASS CO.

Windlass.

No. 9,555. Reissued Feb. 8, 1881.

WITNESSES:

Joseph A. Miller Jr

Henry J. Miller

INVENTORS.

George N Waterbury

Enos Waterbury

By Joseph A. Miller

Atty

N. PETERS, PHOTO-LITHOGRAPHER, WASHINGTON, D. C.

UNITED STATES PATENT OFFICE.

ENOS WATERBURY AND GEORGE N. WATERBURY, OF STAMFORD, CONNECTICUT, ASSIGNORS, BY MESNE ASSIGNMENTS, TO AMERICAN SHIP WINDLASS COMPANY, OF PROVIDENCE, RHODE ISLAND.

WINDLASS.

SPECIFICATON forming part of Reissued Letters Patent No. 9,555, dated February 8, 1881.

Original No. 110,521, dated December 27, 1870. Application for reissue filed November 8, 1880.

*To all whom it may concern:*

Be it known that we, ENOS WATERBURY and GEORGE N. WATERBURY, of Stamford, in the county of Fairfield and State of Connecticut, have invented a new and useful Improvement in Ships' Windlasses; and we do hereby declare that the following is a full, clear, and exact description thereof, which will enable others skilled in the art to make and use the same, reference being had to the accompanying drawings, forming part of this specification, in which—

Figure 1:
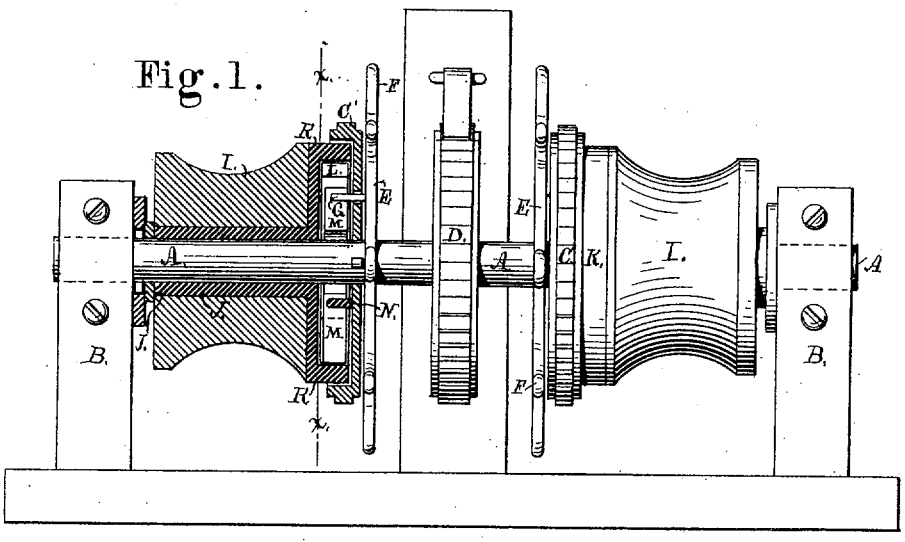
Figure 2:
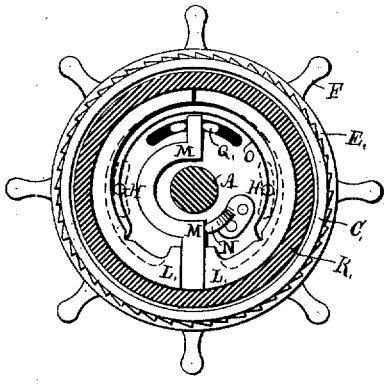
Figure 3:
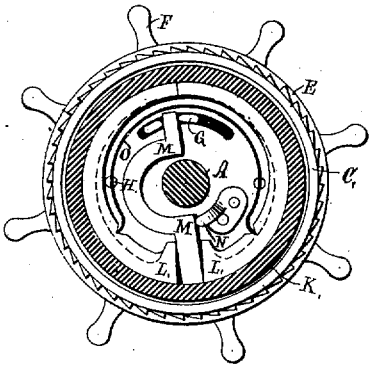

Figure 1 is a front view of our improved windlass, partly in section, to show the construction. Fig. 2 is a vertical cross-section of the same, taken through the line *x x*, Fig. 1, showing the clutch when the windlass is disconnected from the driving shaft or head. Fig. 3 is also a vertical cross-section of the windlass through the same line *x x*, showing the clutch connected with the windlass.

Similar letters of reference indicate corresponding parts.

Our invention has for its object to improve the construction of a ship's windlass in such a way as to make it much more convenient in use, it being so constructed as to allow the cable to be paid out freely, and which shall at the same time be simple in construction and easily operated and controlled; and it consists in the construction and combination of various parts, as hereinafter more fully described.

A is the shaft, which revolves in bearings in the standard B, and to which the ratchet-wheel C and the central ratchet-wheel, D, are securely attached.

E are the wheels, to which are applied or upon which are formed the bars F, by which the power is applied. The wheels E work loosely upon the shaft A; but their movement is limited by the forked or slotted projection G, firmly attached to them, and which projects through a short curved slot in the ratchet-wheels D. The connection between the bar-wheels E and the ratchet-wheels D is further strengthened by pins H, attached to said ratchet-wheels and projecting through short curved slots in the said bar-wheels E.

I are the drums, about which the cable is coiled, and which are placed upon and firmly secured to the sleeves J, or to the disks or wheels K, formed upon the inner ends of the said sleeves J. The sleeves J revolve loosely upon the shaft A. The sides of the wheels K are recessed, or have flanges formed around their outer edges to form recesses, in which are placed the two curved bars or shoes L, which are enough shorter than semicircles to receive one end of the lever M between two of their adjacent ends, the other two adjacent ends of said curved bars resting against each other. The middle part of the lever M is curved to pass around the shaft A, the two end parts of said lever being in line with each other, as shown in Fig. 2. The free end of the lever M is placed in the fork or slot of the projection G.

N is a stop or rest attached to the ratchet-wheel C, and which serves as a guide-stop and fulcrum to said lever.

O is a light spring placed in the recess of the disks or wheels K, with its ends resting against the inner sides of the curved bars L, and which is designed simply to hold the said bars in their place.

By this construction, when power is applied to the ratchet-wheels C, it is applied to the lever M by the stop or projection N, and the tendency is to spread the curved bars L, forcing their outer surfaces against the inner surface of the flange of the wheel or disk K in the manner of a friction-clutch, so that the sleeve J and drum I will be revolved. If, now, a quick movement be given to the bar-wheel E in the other direction, the lever M will be thrown into a position parallel with the faces of the ends of the curved bars L, thus releasing the wheel or disk, allowing the sleeve J and drum I to revolve freely, paying out the cable, its motion being readily regulated and controlled by means of the bar-wheels E.

Having thus described our invention, we claim as new and desire to secure by Letters Patent—

1. In a windlass, the combination, with the driving-shaft and barrel or drum adapted to revolve independently of the driving-shaft, of a wheel for turning the barrel or drum for drawing in the rope, and a friction-clutch for connecting the barrel or drum to the driving-shaft and releasing it therefrom, substantially as set forth.

2. In a windlass, the combination, with the driving-shaft and barrel or drum adapted to revolve independently of the driving-shaft, of a wheel or disk for turning the barrel or drum, and a friction-clutch actuated by said wheel, and adapted to connect or disconnect the barrel or drum and driving-shaft, substantially as set forth.

3. In a windlass, the combination, with a driving-shaft and drum or barrel loosely mounted thereon, of a wheel or disk for turning the barrel or drum, a friction-clutch for connecting and disconnecting the barrel or drum and driving-shaft, and a lever for operating the friction-clutch, substantially as set forth.

4. The combination, with the drum or barrel of a windlass, loosely mounted, of a projecting rim secured to the barrel or drum, the curved bars or shoes L, the lever M, and means, substantially as described, for pressing the shoes against the projecting rim and controlling the paying out of the cable, as described.

5. The combination, with the driving-shaft of a windlass, and a barrel or drum loosely mounted, of a locking device constructed to connect the barrel with the driving-shaft, and a disk or wheel, by the partial rotation of which the locking device is connected or disconnected, as described.

6. The combination, with the bar-wheel E, the lever M, curved bars L, and recessed disk or wheel K, of the drum I and driving-shaft A, constructed to operate as described.

7. The combination of the bar-wheel E, with its slotted projection G, ratchet-wheel C, lever M, curved bars L, recessed disk or wheel K, and sleeve J, with each other and with the shaft A and drum I, substantially as herein shown and described, and for the purpose set forth.

8. In a windlass, the combination, with the driving-shaft and driving-head permanently secured thereto, of a drum loosely mounted on the driving-shaft, and devices interposed between the driving-head and drum for connecting and disconnecting the drum and driving-shaft, substantially as set forth.

9. In a windlass, the combination, with the driving-shaft and driving-head permanently secured thereto, of a drum loosely mounted on the driving-shaft, locking devices interposed between the driving-head and drum, and a hand operating device adapted to be partially rotated to connect or disconnect the drum and driving-shaft, substantially as set forth.

ENOS WATERBURY.
GEO. N. WATERBURY.

Witnesses:
CHAS. R. THOMAS,
CHAS. W. WATERBURY.